United States Patent
Johansson (10) Patent No.: US 7,809,496 B2
(45) Date of Patent: Oct. 5, 2010

(54) ERROR CONTROL IN A TRAFFIC MANAGEMENT SYSTEM

(75) Inventor: Rikard Johansson, Linköping (SE)

(73) Assignee: SAAB AB, Linköping (SE)

( * ) Notice: Subject to any disclaimer, the term of this patent is extended or adjusted under 35 U.S.C. 154(b) by 737 days.

(21) Appl. No.: 11/555,715

(22) Filed: Nov. 2, 2006

(65) Prior Publication Data

US 2007/0106436 A1     May 10, 2007

(30) Foreign Application Priority Data

Nov. 7, 2005 (EP) .................................. 05110412

(51) Int. Cl.
*G06F 19/00* (2006.01)
(52) U.S. Cl. .................................................. 701/117
(58) Field of Classification Search .................. 701/3, 701/13, 17, 23, 26–28, 33–36, 117

See application file for complete search history.

(56) References Cited

U.S. PATENT DOCUMENTS

| 3,096,433 A | * | 7/1963 | Daspit et al. ................. 701/121 |
| 5,434,571 A | | 7/1995 | Erle et al. |

* cited by examiner

*Primary Examiner*—Kim T Nguyen
(74) *Attorney, Agent, or Firm*—Venable LLP; Eric J. Franklin (57) ABSTRACT

A system for monitoring a traffic management system, such as an Air Traffic Management (ATM) system, which includes a position retrieval station, operable to retrieve position information for a traffic object, e.g. a radar station devised to collect radar echoes and generate radar image signals. A computer system is connected to the position retrieval station for generating radar trace data from received position information. An operator station is connected to the computer system for processing trace data for presentation. A false position information source is connected to provide artificial information corresponding to a predetermined property of a false traffic object to the computer system. A comparator unit is connected to the operator station for receiving trace data generated from the artificial information, and devised to detect correlation between the generated trace data and the predetermined property of the false traffic object.

33 Claims, 5 Drawing Sheets

ERROR CONTROL IN A TRAFFIC MANAGEMENT SYSTEM

FIELD OF THE INVENTION

The present invention relates the field of traffic management, preferably an Air Traffic Management (ATM), and particularly to a system and a method for monitoring such system for detecting errors. For the purpose of validating that the traffic management system does not handle traffic information, e.g. relating to position, direction, velocity or identity for traffic objects, in an erroneous manner, the invention provides a solution for generating artificial information representing false traffic objects for processing in the traffic management system, after which a verification process determines whether the traffic management system has processed the artificial information correctly.

BACKGROUND

Over the last decades air traffic density has reached a very high level, while air safety requirements are becoming increasingly stringent. Modern-day air traffic management therefore involves the processing of large quantities of data for use by air traffic controllers and pilots. These data include a broad range of radar data, meteorological data, aircraft positions and flight plans, and instrument landing system data. For the purpose of providing efficient management and control of air traffic, a number of air traffic control centres are provided for covering the air space traffic of a given region or country. Each control centre is communicatively connected to a plurality of radar antennas, and comprises powerful and complex radar signal processing systems, routing means for ensuring that data finds its way to the right destinations, and operating stations for air traffic controllers.

In today's ATM systems, Commercial Off The Shelf (COTS) hardware and software product are frequently used, since there are no international standards defining how ATM systems are to be designed in order to provide safe air traffic management. Recently, however, RTCA (Radio Technical Commission for Aeronautics) released a new document denoted RTCA/DO-278 "Guidelines for Communication, Navigation, Surveillance and Air Traffic Management (NCS/ATM) System Software Integrity Assurance". This document is closely related to RTCA/DO-178B "Software Considerations in Airborne Systems and Equipment Certification", which has been used by commercial aircraft system manufacturers for a number of years. However, if the new RTCA/DO-278 is given the same status within ATM as RTCA/DO-178B has for aircraft systems, it will be increasingly difficult to make use of COTS equipment without taking some form of system architectural measure.

SUMMARY OF THE INVENTION

Potentially critical events in a traffic management system include undetected erroneous traffic object data. Such data may e.g. relate to radar data picked up by radar stations, or position data retrieved by the traffic objects themselves by means of a satellite-based positioning system. If a radar signal representing a radar echo is processed to generate a radar trace, and this trace or information related to this trace is subsequently presented at an operator station for an air traffic controller as having a property which does not match the original radar signal, it may be difficult for the air traffic controller to detect this error. Similarly, position information retrieved by traffic objects and relayed to an air traffic control centre will be used to generate trace data, and the trace or information related to the trace is subsequently presented at an operator station for an air traffic controller, and also that trace may be erroneous. The error may e.g. consist of presenting an untrue position, velocity or identity for the traffic object which gave rise to the radar echo or which provided position information.

An overall object of the invention is therefore to provide a solution which minimises the occurrence of undetected erroneous data in an ATM system. According to a first aspect of the invention, this object is fulfilled by a system for monitoring a traffic management system comprising a position retrieval station, operable to retrieve position information for a traffic object, a computer system connected to the position retrieval station for generating trace data representing movement of a traffic object from received position information, and an operator station connected to the computer system for processing trace data for presentation. A false information source is connected to provide artificial information, corresponding to a predetermined property of a false traffic object, to the computer system. A comparator unit is connected to the operator station for receiving trace data generated from the artificial information, and devised to detect correlation between the generated trace data and the predetermined property of the false traffic object.

According to a second aspect, the stated object is fulfilled by a method for monitoring a traffic management system comprising a position retrieval station operable to retrieve position information for a traffic object, a computer system generating trace data from received position information, and an operator station processing trace data for presentation, comprising the steps of:

providing artificial information, corresponding to a predetermined property of a false traffic object, to the computer system;

generating trace data from the artificial information;

receiving trace data generated from the artificial information; and detecting correlation between the generated trace data and the predetermined property of the false traffic object.

As a result of the invention, a monitoring procedure is provided which repeatedly may be used to verify that radar echoes, satellite-based position information, traffic object identity information, and so on, are treated correctly in the traffic management system. Discrepancies found when comparing the false trace data and the trace data generated from the artificial information preferably leads to some form of action, such as to trigger an alarm or automatically switch to a backup system for generating traces or a backup operator station. Preferably, the trace data representing the artificial radar signal or position information is tagged or otherwise identified as being a non-real trace, and is also detected as a false trace in the operating station and thereby withheld from presentation on the operator station. This way, a transparent monitoring system and procedure is provided, since the air traffic controller need not be bothered by simulated traffic objects presented on the operator station.

Further features of different embodiments of the invention are defined in the appended claims.

BRIEF DESCRIPTION OF THE DRAWINGS

Different embodiments of the invention will be described below with reference to the accompanying drawings, on which FIG. 1 schematically illustrates an ATM system using radar-based traffic information devised in accordance with an embodiment of the invention.

DETAILED DESCRIPTION OF PREFERRED EMBODIMENTS

The description below presents the present invention in an embodiment for application in an Air Traffic Management (ATM) system. However, it should be completely clear for the skilled person that the principles, elements and method steps according to the invention are equally applicable to other types of traffic management, such as for shipping at sea or for land-carried traffic. The following description should therefore be understood as an example for a scene in which the invention is advantageously applicable, while other fields of use may still be realised within the scope of the appended claims.

The invention will first be described by means of examples relating to a radar-based ATM system, where one or more radar stations are used as position retrieval stations, operable to retrieve position information for a traffic object. Subsequently, the invention will be described by means of an example relating to an ATM system based on satellite-positioning, such as a GPS system, where a satellite signal receiver in a traffic object is used as a position retrieval station, operable to retrieve position information for that traffic object based on the received satellite signals.

Figure 1:
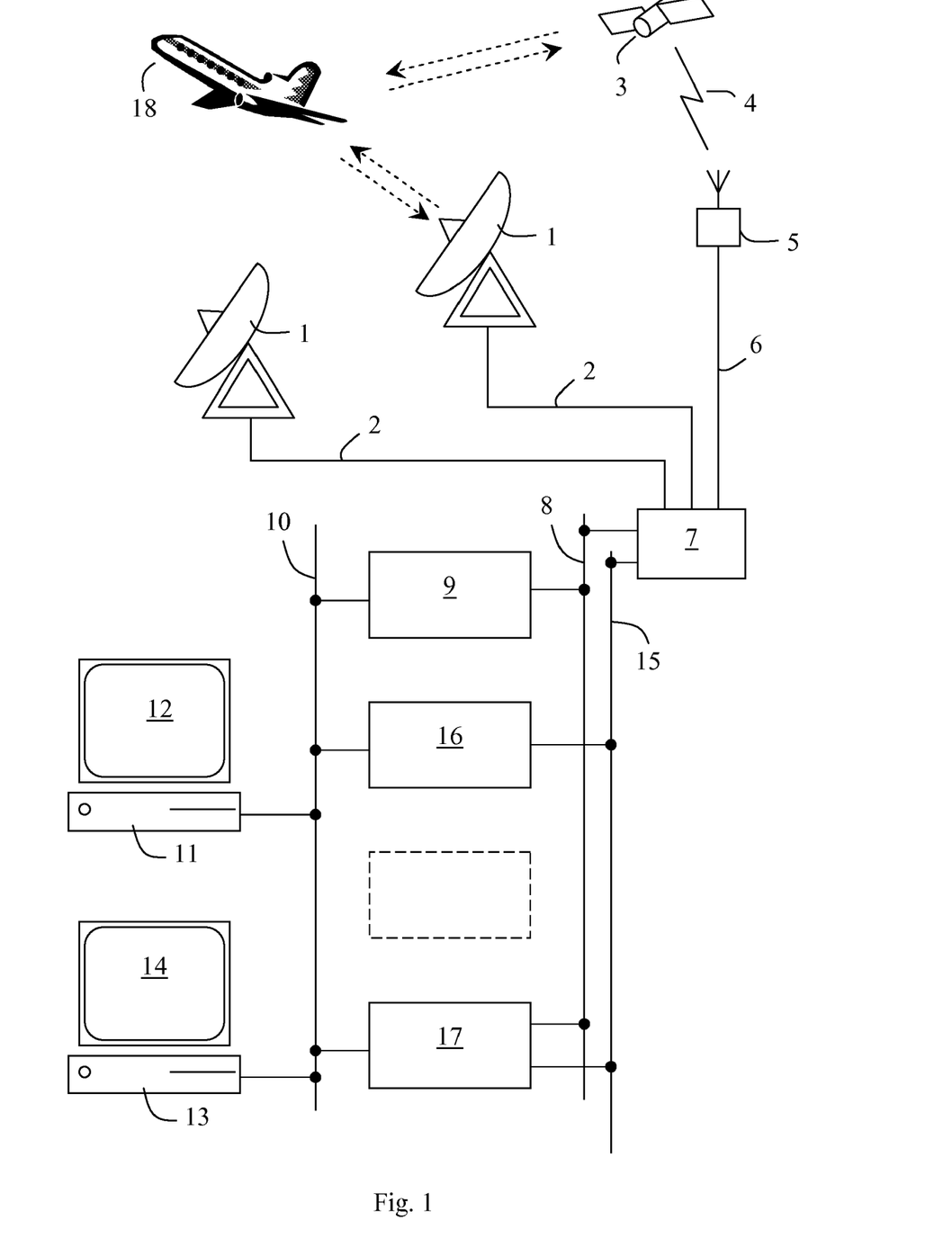

FIG. 1 schematically illustrates an ATM system. A plurality of radar stations 1 are communicatively connected to a radar image signal receiving node 7 at an air traffic control centre. Connection 2 may be achieved by means of network specifically dedicated for this purpose or a network common for other types of communication, and may be wire-bound or wireless. Airborne radar stations, carried in balloons or satellites 3 may also be included in the system, devised to communicate by radio over the air 4 with a radio station 5 having a connection 6 to the radar image signal receiving node 7.

A radar image signal delivered from a radar station is typically an image in which one or more objects, or targets, are indicated, with associated data for the indicated objects. Typically, such data includes position data and identity data. For an aircraft, the radar station 1 may e.g. send a request signal within a certain lobe directed at a certain angle. When received by an antenna in the aircraft 18, a response signal is transmitted including altitude data and identity data for the aircraft 18. When combined, the radar station has retrieved radar target property information for the aircraft 18, including position or coordinate data in three dimensions as well as the identity of the aircraft. A radar image signal including this information is then sent to an air traffic control centre.

At the air traffic control centre the radar image signal receiving node 7 is connected to at least one radar computer system 9 through an input interface 8, such as an interface bus. Computer system 9 is drawn as one object, but may of course comprise plural computer units. Furthermore, the radar computer system may well be distributed, since air traffic control centres generally perform air traffic management for vast areas. The radar computer system 9 is devised to receive and handle radar image signals from many different radar stations, along with other associated types of data, such as meteorological data, flight plans and so on. FIG. 1 also illustrates a second computer system 16, which may operate parallel to the computer system 9, or be included as a backup system. Further computer systems or supervision nodes may also be included in the system, as is schematically illustrated in the drawing by a box with a dashed contour.

Using the received radar image signals the computer system 9 generates so called radar traces. A radar trace is basically a combination of a number of radar images or image signals captured in successive time steps, wherein a line drawn between or in some other way adapted to follow successive coordinates for an object indicates the path and potentially also speed of the object. The radar computer system 9 has an output interface 10, such as a bus, to which one or more operator stations 11, 13 are connected. The operator stations are operated by air traffic controllers for guiding and controlling the airspace. Radar traces as generated by the computer system 9 are provided to the operator stations 11, 13, where they are processed for presentation on a display 12, 14.

An operator station is typically used for presenting a selected portion of the airspace, such as a sector of the airspace above and around an airport. The information presented to the air traffic controllers is thus very critical, and it is consequently important that it can be relied upon. However, once a radar trace is presented it is often very difficult for the controller to know whether or not the presented information represents a true image of the radar targets.

In order to check and monitor that radar images are treated in an appropriate way in the ATM system, a monitoring system is included in accordance with the invention. In FIG. 1 the monitoring system is schematically illustrated as a monitoring node 17 communicatively connected to computer system 9. More specifically, monitoring node 17 is coupled to input interface 8 of computer system 9, and preferably also to alternative input interface 15 of second computer system 16. Monitoring node 17 includes the function of a false radar echo source, and is a such devised to generate artificial radar image signals and to provide such signals to computer system 9. From a radar image signal input in computer system 9, the artificial radar image signals from monitoring node 17 are preferably perceived as any other radar image signal received from actual radar stations through receiving node 7. In one embodiment, the artificial radar image signal may be detected already in computer system 9 as being false, but it is preferably still treated as other radar image signals for the purpose of generating radar traces. Detection of the artificial signal as being false may be achieved by assigning a special fake ID to the radar target, which is recognized in the computer system 9. Such an ID can be selected such that it cannot be mistaken for a real transponder code. Alternatively, some other form of tag is attached to the data representing the radar image signal, which tag is read and understood by the computer system to determine that the radar image signal is false.

When receiving the artificial radar image signals, computer system 9 will generate a radar trace, which as such may be performed in accordance with any prior art solution. Radar trace data are then outputted to the operating station 11 assigned to control a certain sector of the airspace. The trace data is processed therein for presentation, preferably by means of a graphical user interface (GUI), together with radar traces for other targets detected by the radar antennas of the system. If the artificial radar image signal has not been detected as representing a false target in computer system 9, the trace data is preferably identified as representing a false target in the operator station. As described above, this is preferably achieved by reading an evaluating identification data for the target or a tag attached to the image data which is passed on by the computer system. By detecting the artificial radar image signals as being false, dedicated software in the operating station is devised to withhold the false trace from presentation. This way, the actual generation of false echoes which are allowed to be processed as real radar echoes for the purpose of determining if they are correctly processed, will be completely transparent to the air traffic controller.

Figure 3:
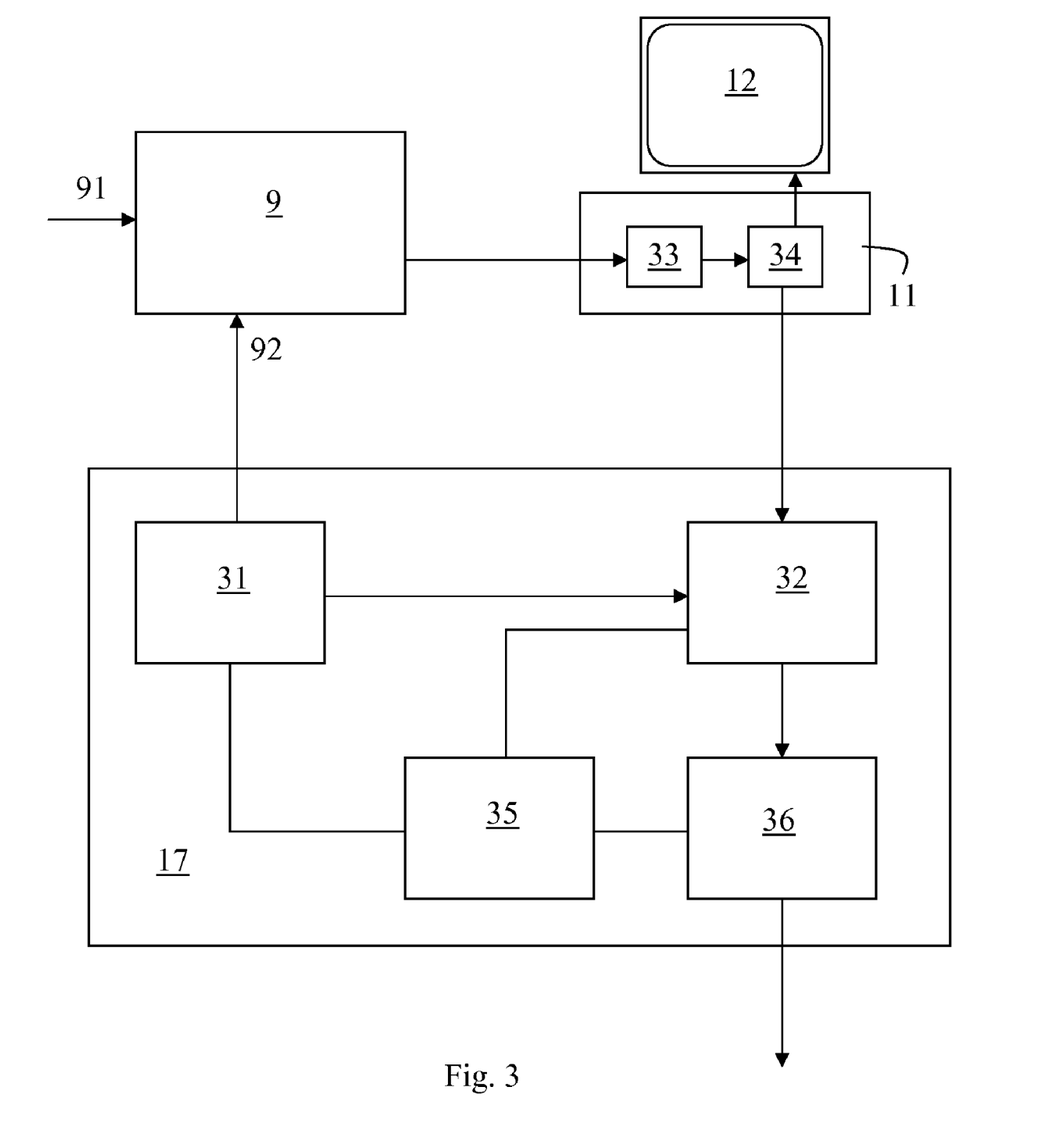
FIG. 3 schematically illustrates a block diagram of an embodiment of a monitoring node connected to an ATM system for carrying out the invention.

Preferably, the radar trace data generated from the artificial radar image signal is tapped off and provided back to the monitoring node 17 as late as possible prior to presentation on the display 12 of operating station 11. The communicative connections between monitoring node 17 and operating station 11 are schematically illustrated in FIG. 3, where illustrated elements represent functions rather than actual units.

Computer system 9 has an input 91 for radar image signals captured by radar antennas, and an input 92 for artificial radar image signals generated by a false echo source 31 of monitoring node 17. Radar image signals are processed into radar trace data, typically including position or coordinate data and identity data for objects detected in the radar images. The radar trace data is passed to operating station 11, where the data is processed in a microprocessor system 33 for presentation on a display 12. Processing for presentation may include steps of combining the trace data as received from computer system 9 with other related information fetched from other sources, such as databases responsive to transponder code ID or through manual input by the air controller. Furthermore, processing before presentation may include transformation of position data related to the airspace into coordinate data with reference to pixels in the display. Presentation is subsequently performed by a display driving unit 34 which cooperates with display 12 to realize GUI.

Data for presentation related to a false radar echo are, as mentioned, preferably identified as being false either already by computer system 9 or by processor 33 of operator station 12. However, the artificial radar image signal and the corresponding generated false trace data are still processed as any other echo. The trace data generated from a false echo, or even more preferably, the data processed for presentation, is tapped off and outputted from operating station and provided to monitoring node 17.

Monitoring node 17 is preferably a computer controlled by a processor system 35, which is schematically illustrated as being connected to the other elements of monitoring node 17. Monitoring node 17 further comprises a comparator function 32, which is arranged to receive input from both the false radar echo source 31 and the data tapped off from operator station 11. If neither computer system 9 nor operator station 11 are devised to recognize false echoes, data related to all echoes, real and false, for presentation on display 12 are tapped off. In such an embodiment, comparator function 32 itself is preferably instead arranged to detect data related to false echoes, and to dismiss all real echoes.

According to the invention, comparator function 32 is devised to compare a predetermined property of the false echo in the artificial radar image signal provided from source 31, with corresponding data tapped off from operator station 11 as generated into trace data from the artificial radar image signal. Typically, the predetermined property may be position data of a simulated target in a single radar image, or a path followed by that target over a number of successive artificial radar images. Yet another example of a property may be identity data of the simulated target. Processor system 35 will control comparator function 32 to make a correlation test between the two related sets of data, i.e. the predetermined property from echo source 31 and the data processed for presentation from operator station 11.

Some form of criterion is preferably set up, marking an acceptable deviation between the two sets of data. For example, the criterion may be that if a preset threshold is exceeded, an action signal generator 36 is triggered to issue an action signal. For position data, the criterion may be that the data for presentation may not deviate more than a preset number of meters from the predetermined property of the simulated echo. In a corresponding manner, a corridor may be defined around a path followed by a simulated target, where the corridor has a preset width and the path for the simulated target defines a centre part in the corridor. The criterion may then be that the data for presentation may not at any point fall outside that corridor. Besides the risk that targets are presented on a wrong location in the airspace, or with erroneous related data, there is also a potential risk that the target is completely missed, or suppressed in a filter, in computer system 9 or operating station 17. In order to cope also with such a scenario, comparator function 32 may also be devised with a timing function. A criterion for monitoring that a radar image signal is processed correctly may then be that not more than a preset maximum time may lapse between generation of the artificial radar image signal in echo source 31, and detection that corresponding trace data has been processed for presentation.

If an error has been found, e.g. that spatial data of the generated trace data processed for presentation deviates too much from the predetermined spatial data, or if a timing criterion has not been met, action signal generator is automatically triggered to issue an action signal. In a simple embodiment, the action signal is received in an alarm device, devised to issue an audible or visual warning. The warning may then be used for initiating a manual or automatic fault detection of the ATM system. In an alternative solution, which may be combined with an alarm device, a detected error will trigger the alarm signal to be issued to an ATM system controller (not shown), which is devised to switch to an auxiliary system for subsequent handling of radar echoes responsive to receipt of the action signal. This may be a switch to an auxiliary operator station 13, to another computer system 16, or to a complete backup system (not shown in FIG. 1).

Figure 4A:
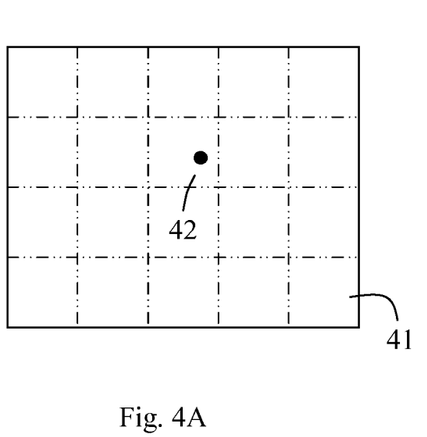
FIGS. 4A and 4B schematically illustrate the underlying principle behind a comparative correlation check forming part of one embodiment of the invention where a false radar signal representing a target position is provided.
Figure 4B:
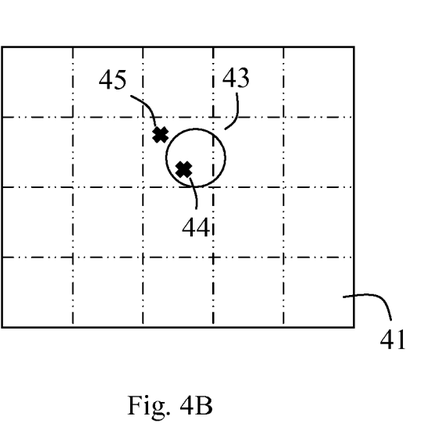

As a mere example, FIGS. 4A and 4B illustrate the comparative check for correlation according to an embodiment of the invention. In FIG. 4A a simulated object or target has a position 42 in a coordinate system 41, and FIG. 4A represents the artificial radar image generated by echo source 31. From position 42, a tolerance level defined by a circle with a certain radius is defined. FIG. 4B represents a schematic representation of the correlation check, whereas it should be understood that the monitoring function of the invention preferably is, as mentioned, completely transparent. FIG. 4B illustrates the corresponding coordinate system, with tolerance circle 43 indicated. Should the radar image of FIG. 4A be processed to generate radar trace data for presentation according to position 44, the correlation would give a positive result, and no action signal would be generated. On the other hand, if the radar trace data for presentation assumes position 45, which is outside circle 43, comparator function 32 would trigger generation of an action signal from action signal generator 36.

Figure 5A:
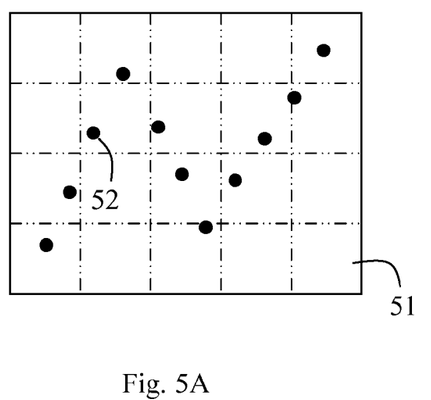
FIGS. 5A and 5B schematically illustrate an example corresponding to FIGS. 4A and 4B, respectively, where a false radar signal representing a target path is provided.
Figure 5B:
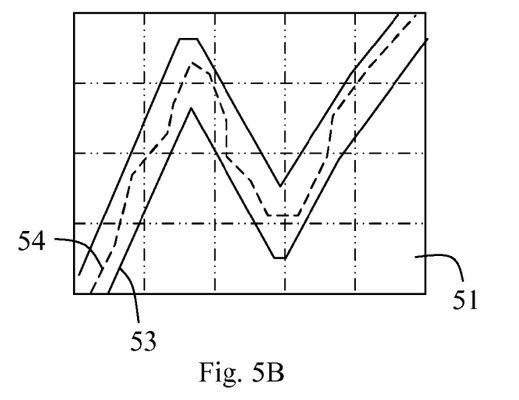

FIGS. 5A and 5B schematically illustrate a corresponding embodiment for a moving target. In this case, the artificial radar image signal includes a plurality of successive radar images, between which a target position 52 moves along a simulated path over a coordinate system 52. FIG. 5B illustrates the related tolerance level, by means of a corridor 53 with perimeter walls at a preset distance beside the simulated path. The dashed line 54 represents the path as ready for presentation in operator station 11, processed from trace data generated from the artificial radar image signals. In this case, path 54 is completely located within corridor 53 and the check for correlation therefore does not trigger any action signal generation.

Figure 2:
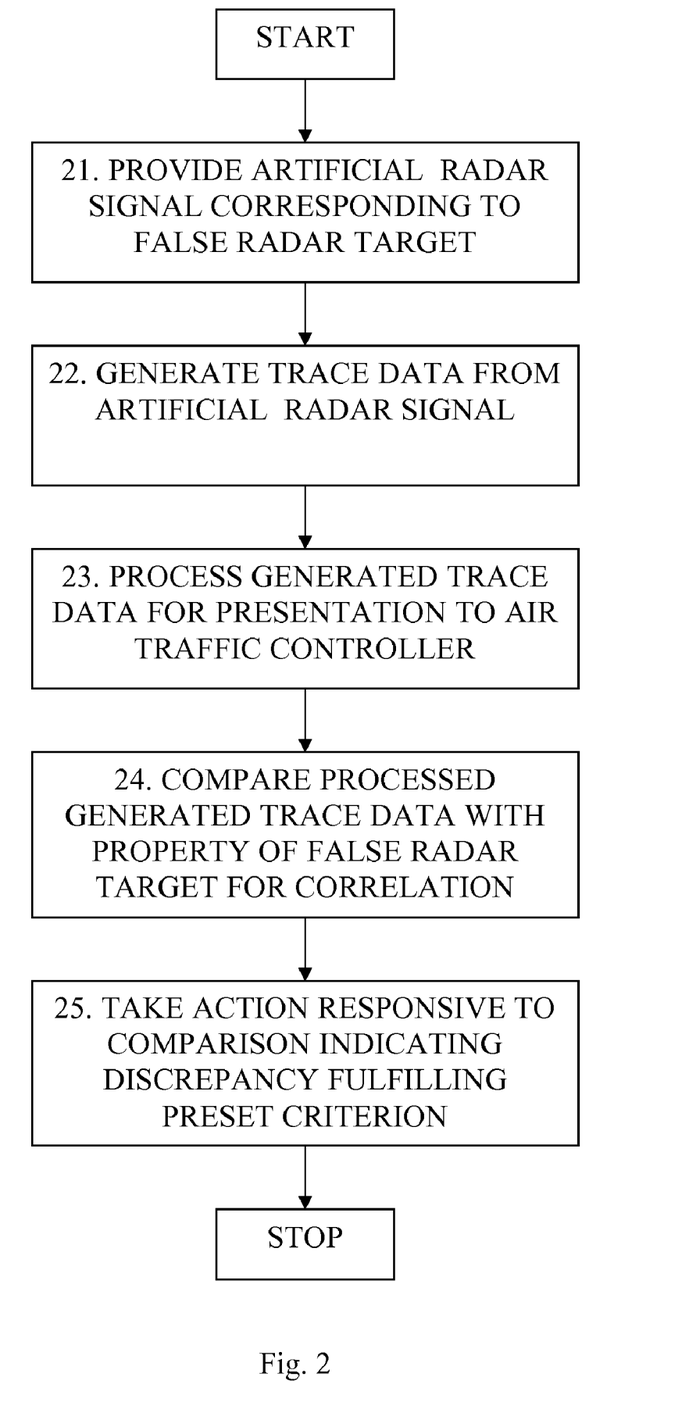
FIG. 2 illustrates a flow chart for an embodiment of the method according to the invention.

FIG. 2 illustrates an embodiment of a method for monitoring an ATM system in accordance with the invention. It does not mean that it discloses the most general form of the method of the invention, but one which is particularly useful for understanding the principles of the invention.

In step 21, an artificial radar signal corresponding to a false radar target is provided to a radar computer system by a false radar echo source.

In step 22, the received artificial radar signal is used by the radar computer system to generate radar trace data 24.

In step 23, generated trace data is provided to an operator station where it is further processed for presentation to an air traffic controller.

In step 24, generated trace data which has been processed for presentation is checked for correlation detection with a corresponding property of a false radar target representing the artificial radar image signal by comparison.

In step 25 a discrepancy identified by the comparison is used to selectively trigger generation of an action signal, if a preset criterion is met.

The process for providing artificial radar image signals and subsequently investigate whether or not they are correctly treated in the ATM system is preferably performed repeatedly. Since it is a transparent process it can basically be ongoing with any suitable repetition frequency, as long as it is not considered to occupy unnecessary computing power or communication bandwidth usable for other purposes in the ATM system.

Figure 6:
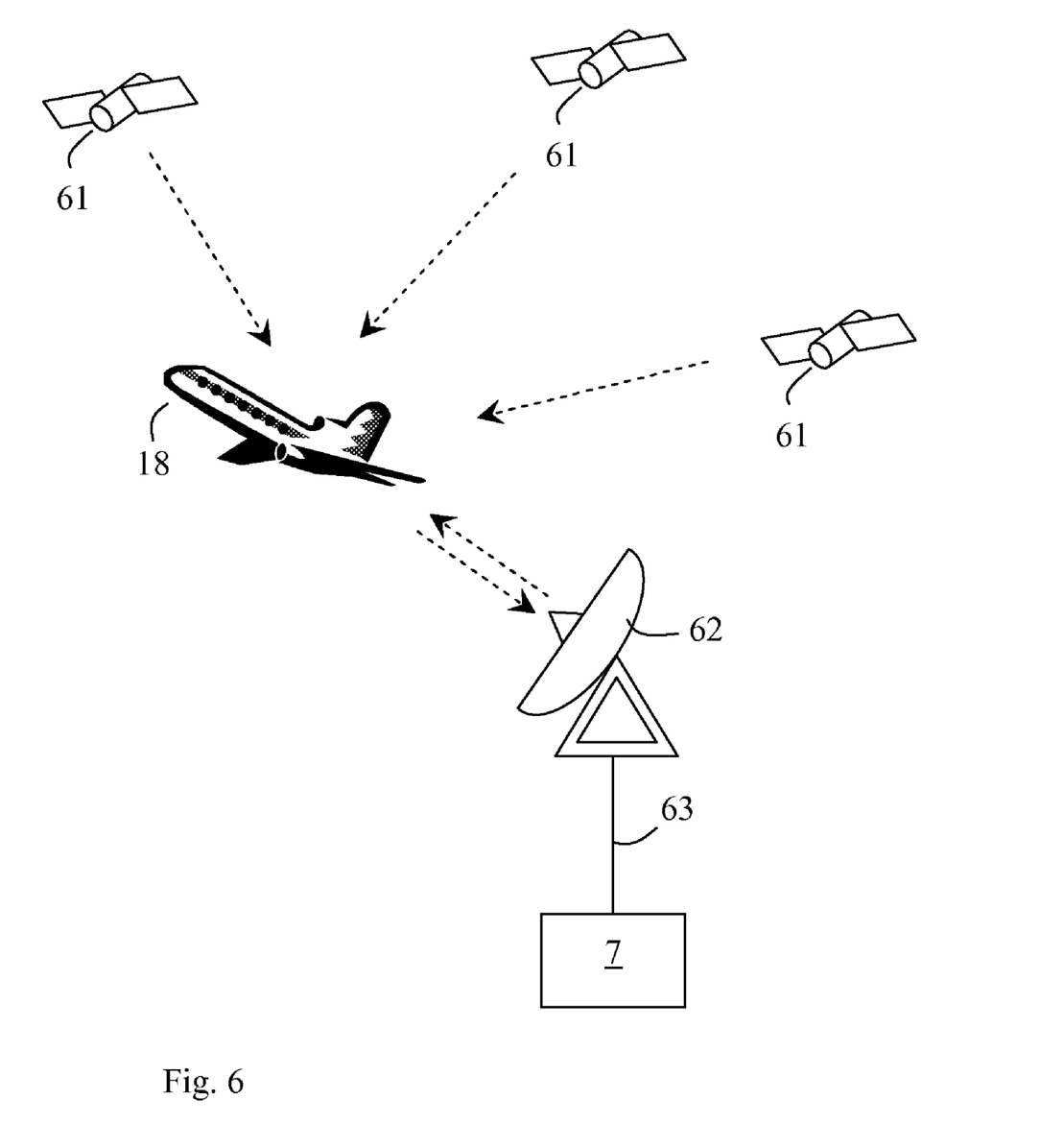
FIG. 6 schematically illustrates an ATM system devised in accordance with an embodiment of the invention, using a satellite-based system for positioning of traffic objects.

FIG. 6 schematically illustrates a part of an ATM system, where the elements described with reference to FIG. 1 have been left out. However, the ATM system of FIG. 6 also includes the computer system 9 and operator station 11, and the other elements connected below node 7 in FIG. 1. According to the embodiment of FIG. 6, each traffic object 18 is provided with a signal receiver for receiving coded signals from a plurality of satellites 61. Triangulation or other suitable methods are then used to calculate the position for the traffic object 18. Typically, GPS (Global Positioning System) is employed for positioning the traffic object by means of a built-in GPS receiver. This way, each traffic object fitted with a GPS receiver may retrieve information about its own position, and relay that information to other traffic objects and/or to a receiving antenna 62 over a wireless communication link. This technology is as such known, e.g. as disclosed in U.S. Pat. No. 5,506,587. The receiving antenna 62 is connected to receiving node 7 at an air traffic control centre, which in turn provides position information from traffic objects 18 to the computer system of the ATM system, in a manner similar to what has been described with reference to FIG. 1.

In order to check and monitor that position information for traffic objects is treated in an appropriate way in the ATM system, a monitoring system is included in accordance with the invention, comprising a monitoring node 17 as illustrated in FIG. 1 Monitoring node 17 includes the function of a false information source, and is a such devised to generate artificial information and to provide such information to the computer system. From a position information input in computer system, the artificial information from monitoring node 17 are preferably perceived as any other position information received from actual traffic objects through receiving node 7. In one embodiment, the artificial information may be detected already in computer system as being false, but it is preferably still treated as other position information for the purpose of generating traces. Detection of the artificial information as being false may be achieved by assigning a special fake ID to the false traffic object, which is recognized in the computer system. Such an ID can be selected such that it cannot be mistaken for a real transponder code. Alternatively, some other form of tag is attached to the data representing position information, which tag is read and understood by the computer system to determine that the artificial information is false.

When receiving the artificial information, the computer system will generate a trace. Trace data are then outputted to the operating station assigned to control a certain sector of the airspace. The trace data is processed therein for presentation, preferably by means of a graphical user interface (GUI), together with traces for other traffic objects providing position information to the ATM system. If the artificial information has not been detected as representing a false traffic object in the computer system, the trace data is preferably identified as representing a false traffic object in the operator station. As described above, this is preferably achieved by reading an evaluating identification data for the traffic object or a tag attached to the data which is passed on by the computer system. By detecting the artificial information as being false, dedicated software in the operating station is devised to withhold the false trace from presentation. This way, the actual generation of false information which is allowed to be processed as real position information for the purpose of determining if they are correctly processed, will be completely transparent to the air traffic controller. Preferably, the trace data generated from the artificial information is tapped off and provided back to the monitoring node 17 as late as possible prior to presentation on the display 12 of operating station 11.

With the present invention, only the monitoring node 17 and the parts 34 of the operator station defining the interface to the display need to be developed according to the requirements of RTCA/DO-278. By employing the present invention in an ATM system, most parts of the system may therefore be designed and built using COTS, while still meeting the requirements of RTCA/DO-278. This result is that huge cost savings can be made, particularly compared to the measures which would have to be made if the entire ATM system were to be qualified to meet RTCA/DO-278.

The invention has been described above by means of examples and simplified drawings, and the skilled person will realise that variations may be made within the scope of the appended claims.

The invention claimed is:

1. A system for monitoring a traffic management system, comprising:
a position retrieval station, operable to retrieve position information for a traffic object,
a computer system connected to the position retrieval station for generating trace data representing movement of the traffic object from the retrieved position information, an operator station connected to the computer system for processing the trace data for presentation of the trace data at the operator station, a false information source connected to the computer system to provide artificial information, corresponding to a predetermined property of a false traffic object, and a comparator unit connected to the operator station for receiving trace data generated from the artificial information, and devised to detect correlation between the trace data generated from the artificial information and the predetermined property of the false traffic object to detect errors in the trace data generated from the artificial information.

2. The system according to claim 1, wherein the operator station comprises a detector configured to detect the trace data generated from the artificial information represents a false trace data, and to withhold the detected false trace data from presentation.

3. The system according to claim 1, further comprising:
an action control unit connected to the comparator unit, and configured to issue an action signal if the comparison reveals a discrepancy between the trace data generated from the artificial information and the predetermined property of the false traffic object.

4. The system according to claim 3, wherein the action control unit is connected to send the action signal to an alarm device.

5. The system according to claim 3, further comprising:
a system controller configured to switch to an auxiliary system for subsequent handling of the retrieved position information responsive to receipt of the action signal.

6. The system according to claim 1, further comprising:
a system controller configured to switch to an auxiliary computer system for subsequent generation of trace data from the position information retrieved from said position retrieval station.

7. The system according to claim 1, further comprising:
a system controller configured to switch to an auxiliary operator station for subsequent processing and presentation of trace data.

8. The system according to claim 1, wherein a computer node connected to the computer system comprises the false information source and the comparator unit.

9. The system according to claim 8, wherein the traffic management system is an Air Traffic Management system, and wherein the computer node and the operator station comprise computer program code in accordance with RTCA/DO-278.

10. The system according to claim 1, wherein the position retrieval station comprises a radar station configured to collect radar echoes and generate radar image signals, wherein the computer system is connected to the radar station for generating radar trace data from the received radar image signals, wherein the false traffic object is a false radar target, and wherein the false information source is a false echo source connected to the computer system to provide an artificial radar image signal, corresponding to a predetermined property of the false radar target, to the computer system.

11. The system according to claim 10, wherein said artificial radar image signal comprises two or more successive artificial radar images in which the false radar target has different position data, said predetermined property of the false radar target represents a movement of the false radar target which is comparable to the trace data generated from the artificial information.

12. The system according to claim 1, wherein the position retrieval station comprises a satellite signal receiver arranged in a traffic object, wherein the traffic object comprises a positioning unit configured to calculate information about its own position by using satellite signals from a plurality of satellites, and a communication station, connected to the computer system, for receiving calculated position information from traffic objects over a wireless communication link, wherein the false information source is connected to provide an artificial signal corresponding to a predetermined position of a false traffic object to the computer system.

13. The system according to claim 1, wherein trace data comprises position data for the traffic object.

14. The system according to claim 1, wherein trace data comprises velocity data for the traffic object.

15. The system according to claim 1, wherein trace data comprises identification data for the traffic object.

16. The system according to claim 15, further comprising:
an identity unit configured to provide the false trace data with the identification data which is detectable by the operator station as representing the false object.

17. The system according to claim 15, wherein said predetermined property comprises identification data for the false object which is comparable to identification data of the trace data generated from the artificial information devised for presentation on the operator station.

18. A method for monitoring a traffic management system comprising a position retrieval station operable to retrieve position information for a traffic object, a computer system generating trace data from retrieved position information, and an operator station processing the trace data for presentation, the method comprising:
providing artificial information, corresponding to a predetermined property of a false traffic object, to the computer system;
generating trace data from the artificial information;
receiving the trace data generated from the artificial information; and
detecting correlation between the trace data generated from the artificial information and the predetermined property of the false traffic object to detect errors in the trace data generated from the artificial information.

19. The method according to claim 18, further comprising:
detecting the trace data generated from the artificial information represents a false trace data; and
withholding the detected false trace data from presentation.

20. The method according to claim 18, further comprising:
issuing an action signal if the comparison reveals a discrepancy between the generated trace data and the predetermined property of the false traffic object.

21. The method according to claim 20, further comprising:
starting an alarm triggered by the action signal.

22. The method according to claim 20, further comprising:
receiving the action signal in a system controller; and
switching subsequent handling of position information responsive to receipt of the action signal to an auxiliary system.

23. The method according to claim 18, further comprising:
switching subsequent generation of trace data from the position information retrieved from said position retrieval station to an auxiliary computer system.

24. The method according to claim 18, further comprising:
switching subsequent processing and presentation of trace data from the position information retrieved from said position retrieval station to an auxiliary operator station.

25. The method according to claim 18, wherein the position information comprises radar image signals generated by radar stations from collected radar echoes, wherein the computer system generates radar trace data from the received radar image signals, wherein the false traffic object is a false radar target, and wherein artificial information is an artificial radar image signal corresponding to a predetermined property of the false radar target.

26. The method according to claim 25, further comprising:
providing the artificial radar image signal as two or more successive artificial radar images in which the false radar target has different position data, wherein said predetermined property representing a movement of the false radar target which is comparable to the generated trace data.

27. The method according to claim 18, wherein the position information is calculated by positioning means in a traffic object based on satellite signals received from a plurality of satellites.

28. The method according to claim 18, wherein trace data from the position information retrieved from said position retrieval station comprises position data for the traffic object.

29. The method according to claim 18, wherein trace data from the position information retrieved from said position retrieval station comprises velocity data for the traffic object.

30. The method according to claim 18, wherein trace data from the position information retrieved from said position retrieval station comprises identification data for the traffic object.

31. The method according to claim 30, further comprising:
providing the artificial information with identification data as the predetermined property for the false traffic object which is comparable to identification data of the generated trace data devised for presentation on the operator station.

32. The method according to claim 30, further comprising:
providing the artificial information with identity data which is detectable by the operator station as representing the false traffic object.

33. The method according to claim 18, wherein the traffic management system is an Air Traffic Management system.

* * * * *